United States Patent
Shaffer et al.

(10) Patent No.: US 6,737,664 B2
(45) Date of Patent: May 18, 2004

(54) PRECISION OPTICAL ALIGNMENT SYSTEM

(75) Inventors: Stephen P. Shaffer, West Hills, CA (US); John C. Bretney, Yorba Linda, CA (US)

(73) Assignee: Raytheon Company, Waltham, MA (US)

(*) Notice: Subject to any disclaimer, the term of this patent is extended or adjusted under 35 U.S.C. 154(b) by 62 days.

(21) Appl. No.: 10/231,917

(22) Filed: Aug. 30, 2002

(65) Prior Publication Data

US 2004/0041108 A1 Mar. 4, 2004

(51) Int. Cl.[7] .............................................. G01B 11/00
(52) U.S. Cl. ........................ 250/559.3; 356/400; 372/28
(58) Field of Search .......................... 250/559.29, 559.3, 250/216, 205, 210.1; 356/399, 400, 401, 139.05, 622; 372/26, 28, 29.01, 29.011

(56) References Cited

U.S. PATENT DOCUMENTS 6,020,955 A * 2/2000 Messina ...................... 356/138
6,507,388 B2 * 1/2003 Burghoorn ................... 355/53
2003/0007522 A1 * 1/2003 Li et al. ........................ 372/20

* cited by examiner

*Primary Examiner*—Kevin Pyo
(74) *Attorney, Agent, or Firm*—John E. Gunther; Leonard A. Alkov; Gelnn H. Lenzen, Jr.

(57) ABSTRACT

An optical alignment system for controlling the position of a laser beam through an optical train. The optical alignment system includes a semiconductor laser source for the generation of an alignment beam, and a beam steering device to manipulate the position of the alignment beam on a multi-element detector. The semiconductor laser is driven to mode hop at a frequency greater than the upper frequency limit of the multi-element detector. Driving the semiconductor laser to mode hop at a frequency greater than the upper frequency limit of the multi-element detector results in a more uniform alignment beam as seen by the detector, as the alignment beam becomes an average of all the operational modes of the semiconductor laser. A more uniform alignment beam results in improved accuracy of the alignment system.

22 Claims, 4 Drawing Sheets

PRECISION OPTICAL ALIGNMENT SYSTEM

This invention was made with Government support under Contract No. N00019-97-C-0009, awarded by The Department of the Navy. The Government has certain rights in this invention.

FIELD OF THE INVENTION

The present invention relates generally to optical alignment systems, and more particularly to high precision optical alignment systems.

BACKGROUND OF THE INVENTION

Electro-optical systems exist which employ active auto-alignment techniques using miniature two-axes mirror technology. For example, U.S. Pat. No. 6,020,955 (incorporated herein by reference) describes an electro-optical system including a pseudo on-gimbal automatic alignment and stabilization system. Such alignment and stabilization systems dynamically boresight and align one or more sensor input beams and a laser output beam using automatic control closed-loop feedback, a single photodetector and stabilization mirror, two off-gimbal optical reference sources and two alignment mirrors.

The alignment system includes an optical apparatus for use in auto aligning line-of-sight optical paths of at least one sensor and a laser. The optical apparatus includes at least one alignment reference source for outputting a laser reference beam that is optically aligned with the line-of-sight of the sensor, and a laser reference source for outputting a laser reference beam that is optically aligned with the line-of-site of the laser.

A laser alignment mirror adjusts the line-of-sight alignment of the laser beam, and a sensor alignment mirror adjusts the alignment of the at least one sensor. Combining optics couple the plurality of reference beams along a common optical path. A gimbal apparatus houses the photodetector which detects the plurality of reference beams. Also within the gimbal apparatus is a fine stabilization mirror, which adjusts the line-of-sight of the optical paths of the at least one sensor and the laser. A processor is coupled to the photodetector, the laser alignment mirror, the sensor alignment mirror, and the fine stabilization mirror for processing signals detected by the photodetector and outputting control signals to the respective mirrors and combining optics to align the line-of-sight optical paths of the sensor and the laser.

The alignment reference source is typically a semiconductor laser such as a laser diode. Applicants have found, however, that a disadvantage of such a configuration is that the semiconductor laser output may experience non-uniformities. For example, the semiconductor laser may dynamically change modes, or mode-hop. Mode-hopping within a semiconductor laser introduces non-uniformities in the alignment reference source. Non-uniformities in the alignment reference source can in turn degrade the accuracy of the alignment system.

Accordingly, there is a strong need in the art for an auto alignment system wherein the alignment reference source is more uniform so as, for example, not to be adversely affected by mode-hopping within the semiconductor laser.

SUMMARY OF THE INVENTION

In the light of the foregoing, one aspect of the invention relates to an optical alignment system which includes a semiconductor laser for generating an alignment beam. A photodetector detects the position of the alignment beam, wherein the photodetector provides a position feedback signal indicative of the position of the alignment beam. An optical system directs the alignment beam, wherein the optical system includes at least one beam steering device, and a controller for controlling the at least one beam steering device to control the position of the alignment beam on the photodetector based on the position feedback signal. A modulated drive current source provides a modulated drive current to the semiconductor laser, wherein the modulated drive current is modulated at a frequency and amplitude which causes the semiconductor laser to mode-hop at a frequency which is greater than the upper frequency limit of the photodetector.

A second aspect of the invention is a method for creating an optical alignment system. The method includes the step of generating an alignment beam from a semiconductor laser. A second step includes detecting the position of the alignment beam on a photodetector, wherein the photodetector provides a position feedback signal indicative of the position of the alignment beam. A third step includes using an optical system to direct the alignment beam, wherein the optical system includes at least one beam steering device, and a controller for controlling the at least one beam steering device to control the position of the alignment beam on the photodetector based on the position feedback signal. A fourth step includes providing a modulated drive current to the semiconductor laser, wherein the modulated drive current is modulated at a frequency and amplitude which causes the semiconductor laser to mode-hop at a frequency which is greater than the upper frequency limit of the photodetector.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
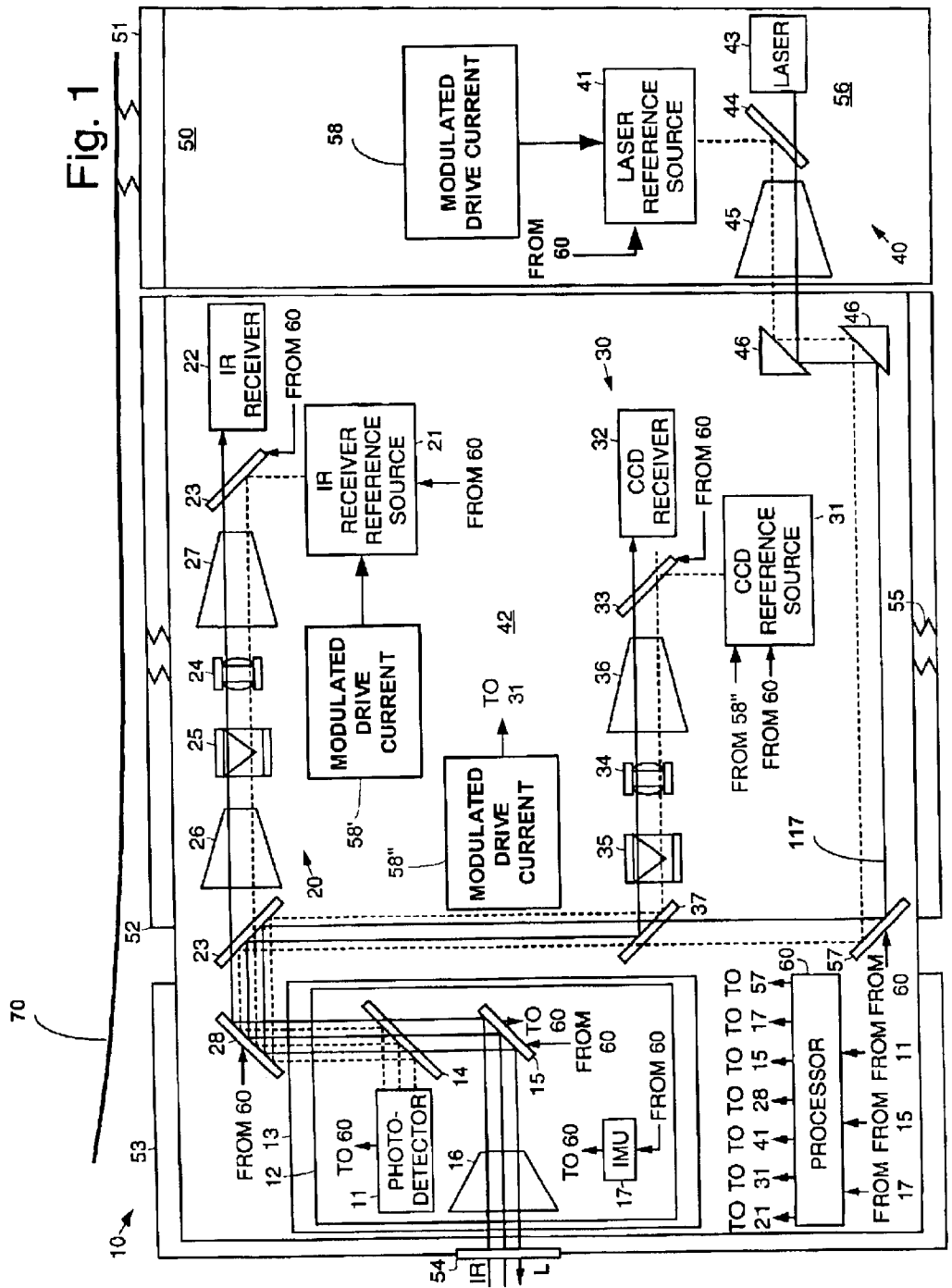
FIG. 1 is an exemplary system in accordance with the present invention for providing line-of-sight alignment and stabilization using precision optical alignment.

The following is a detailed description of the present invention in conjunction with the attached drawings, wherein like reference numerals will refer to like elements throughout.

Referring to the drawing figures, FIG. 1 illustrates an exemplary system in accordance with the principles of the present invention for providing line-of-sight alignment and stabilization. The system 10 comprises a pseudo on-gimbal sensor comprising a photodetector 11 or other light detector, an IR sensor 20, a visible CCD sensor 30 and laser autoalignment subsystem 40, and three time-multiplexed modulated reference sources 21, 31, 41 as is illustrated in FIG. 1. The reference sources 21, 31, 41 are time-multiplexed and pulse amplitude modulated to provide a simple multiplexing scheme without the need for extensive demodulation circuitry. The high frequency (10 KHz) time-modulated pulses are simply synchronously sampled at the peak output response of the photodetector 11 by the processor (described below), enabling closure of high bandwidth auto-alignment servo loops. The exemplary system 10 is implemented as an improvement to an Advanced Targeting Forward Looking Infrared (ATFLIR) pod 50 having on-gimbal mirror fine stabilization. See, e.g., the aforementioned U.S. Pat. No. 6,020,955.

The pod 50 is shown attached to an airborne platform 70 by a pod aft structure 51 that is coupled to a laser optical bench 56. An outer roll gimbal 52 carrying a wind screen 53 with the window 54, is gimbaled with bearings (not shown) in pitch, and rolls on bearings (not shown) relative to the pod aft structure 51. The roll gimbal 52 also carries along in roll an IR/CCD optical bench 42 that is attached at its center of gravity using an elastic isolator 55 that attenuates both vibration of the platform 70 and aerodynamic load disturbances to the IR/CCD optical bench 42 to provide for stabilization.

The IR/CCD optical bench 42 houses an IR sensor receiver 22, the time multiplexed modulated infrared (IR) reference source 21 that is mechanically aligned to the center of the field of view of the IR sensor receiver 22, and a multispectral beam combiner 23 that combines beams of the coaligned IR sensor receiver 22 and the IR reference source 21. In the IR optical path is an IR imager 27 (or IR imaging optics 27), a focus mechanism 24, a reflective derotation mechanism 25 that derotates the IR beam to keep the IR image erect, and a relay beam expander 26 that expands the beams associated with the coaligned IR sensor receiver 22 and IR reference alignment source 21.

The IR/CCD optical bench 42 also houses a visible CCD sensor receiver 32, the time multiplexed modulated CCD optical reference source 31 that is mechanically aligned to the center of the field of view of the CCD sensor receiver 32, and a beam combiner 33 that combines the coaligned beams associated with the CCD sensor receiver 32 and the CCD reference source 31. In the optical path is a visible imager 36 (or visible imaging optics 36), a focus mechanism 34 and a refractive derotation mechanism 35 that derotates the visible channel beam to keep the visible image erect.

The laser optical bench 56 in the exemplary system 10 is not isolated and does not rotate with the roll gimbal 52. The laser optical bench 56 houses a laser 43, the time multiplexed modulated laser reference source 41 that is mechanically aligned to the output beam of the laser 43, a beam combiner 44 that combines the beams from the coaligned laser and laser reference source 41, and a beam expander 45 that expands the beams from the coaligned laser 43 and laser reference source 41. A pair of reflectors 46 are provided to couple the beams from the coaligned laser 43 and laser reference source 41 to a two-axis laser alignment mirror 57 on the IR/CCD optical bench 42. The reflectors 46 may not be required for other system configurations.

The IR/CCD optical bench 42 and the laser optical bench 56 house a modulated drive current source 58, 58', 58' for each laser reference source 21, 31, 41 in accordance with the present invention. As will be described in more detail below, each modulated drive current source 58, 58', 58" provides a modulated drive current to a respective laser reference source 21, 31, 41. By modulating the drive current at high frequency, each laser reference source 21, 31, 41 serves as a more uniform alignment source. This allows more accurate alignments to be achieved within the system.

The two-axes laser alignment mirror 57 steers beams from the laser 43 and laser reference source 41 into alignment with the IR beam and the beam from the IR reference source 21. The CCD/laser beam combiner 37 combines the coaligned visible beam and beam from the CCD reference source 31 with the coaligned beams from the laser 43 and the laser reference source 41. The multispectral beam combiner 23 combines these four beams with the IR beam and the beam from the IR reference source 21, and all six beams are steered together onto an inner gimbal 12 using a two-axes IR/CCD alignment mirror 28.

The optical bench 42 houses an outer pitch gimbal 13 on bearings (not shown) which in turn mounts the inner yaw gimbal 12 on bearings (not shown). The inner gimbal 12 houses a multi-spectral beamsplitter 14 which transmits the IR, visible and laser beams and reflects beams from the modulated reference sources 21, 31 and 41 onto the photodetector 11 to close nulling auto-alignment loops. The photodetector 11 is mechanically aligned to the line of sight of a telescope beam expander 16. A two-axes fine stabilization mirror 15 is used to stabilize the IR, visible and laser beams prior to the telescope beam expander 16. A three-axes fiber optic gyro, low noise, high bandwidth, inertial measurement unit (IMU) 17 is provided to close the line-of-sight inertial rate stabilization loops, which generate fine stabilization mirror position commands relative to the line-of-sight of the inner gimbal 12. The wind screen 53 is slaved to the outer gimbal 13 to maintain the window 54 in front of the telescope beam expander 16.

A processor 60 is coupled to the photodetector 11, the respective reference beam sources 21, 31 and 41, the alignment mirrors 28 and 57, and the IMU 17. The processor 60 executes programming that implements closed loop feedback control of the alignment mirrors 28 and 57 based upon the output of the photodetector 11 to adjust the alignment of the beams of the respective reference sources 21, 31 and 41 to align the optical paths of the IR sensor receiver 22, the visible CCD sensor receiver 32 and the laser 43.

Figure 2:
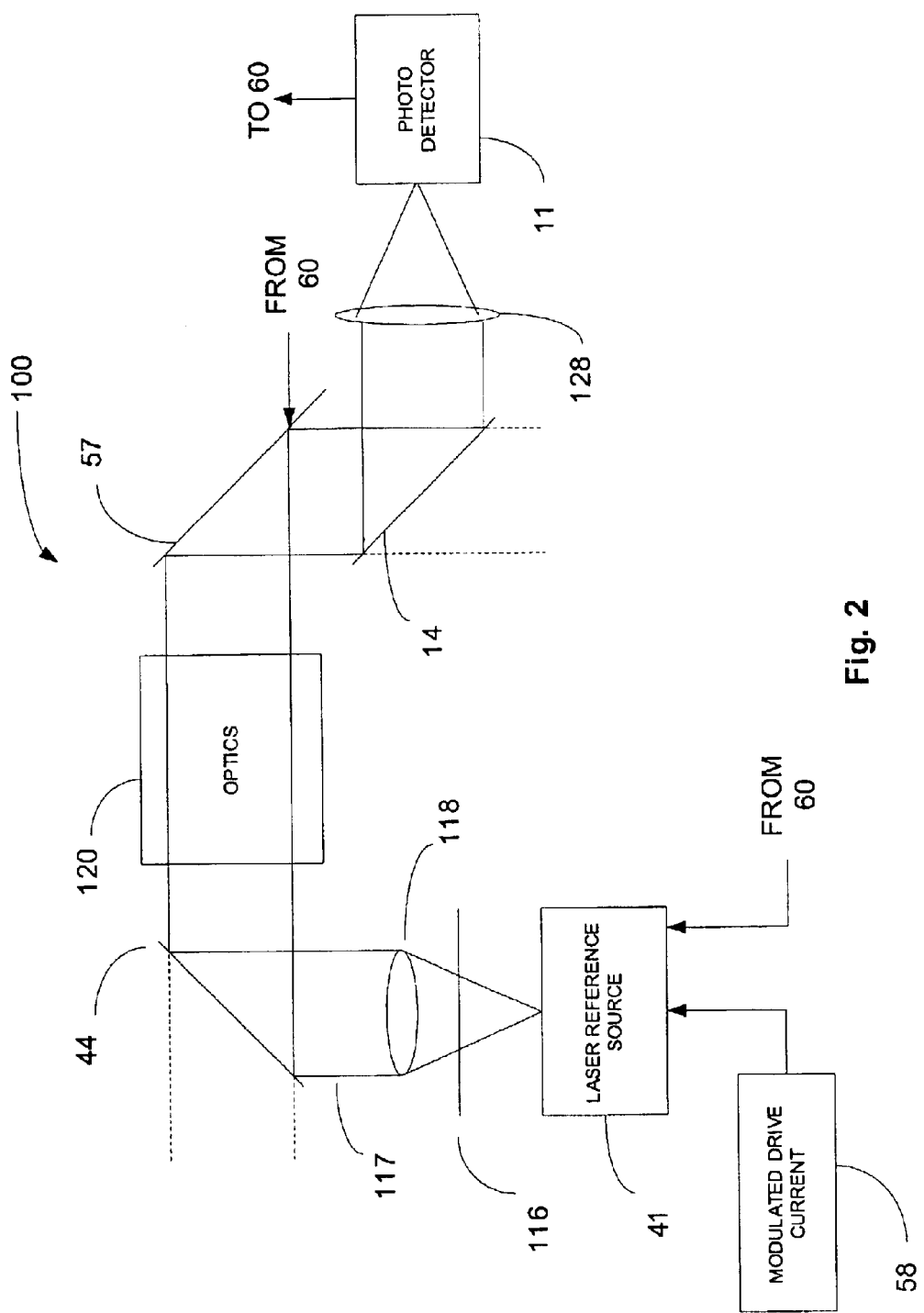
FIG. 2 is a simplified diagram of the optical alignment system within the system of FIG. 1 in accordance with the present invention.

Referring now to FIG. 2, a simplified diagram of the laser alignment system 100 within the system 10 (FIG. 1) is illustrated in exemplary relevant part. The laser alignment system 100 includes the aforementioned laser reference source 41 and modulated drive current supply 58. As one skilled in the art will appreciate, the laser reference source 41 may be semiconductor laser, such as a laser diode 41. The modulated drive current supply 58 supplies the modulated drive current to the laser diode 41.

When energized via the modulated drive current supply 58, the laser diode 41 outputs a laser beam which is imaged by way of a pinhole 116 and lens 118 to form an alignment beam 117. The alignment beam 117 is routed through the above-described optical system that includes the beam combiner 44 and optics train 120 (representing the beam expander 45 and pair of reflectors 46 as shown in FIG. 1). The optics train directs the beam 117 so as to be incident on the two-axes laser alignment mirror 57, also referred to herein as a steering mirror 57, as described above. Subsequent to the steering mirror 57, the alignment beam 117 ultimately is directed to the beam splitter 14 which reflects the beam 117 as a spot onto the photodetector 11 via an imaging lens 128.

The processor 60 controls the steering mirror 57 to maintain the alignment beam 117 on a desired location on the multi-element photodetector 11, as will be described more fully below. As is known, altering the angle of the steering mirror 57 alters the position of the alignment beam 117 on the multi-element photodetector 11. The respective angles of the steering mirror 57 are controlled by the processor 60. The photodetector 11 provides a feedback signal to the processor 60 indicative of the position of the alignment beam 117 on the detector 11. In the exemplary embodiment of the present invention, the multi-element photodetector 11 is a quad-detector and is referred to herein as a quad-detector 11, although it will be appreciated by those of ordinary skill in the art that other types of detectors may easily be substituted without departing from the scope of the invention.

Figure 3A:
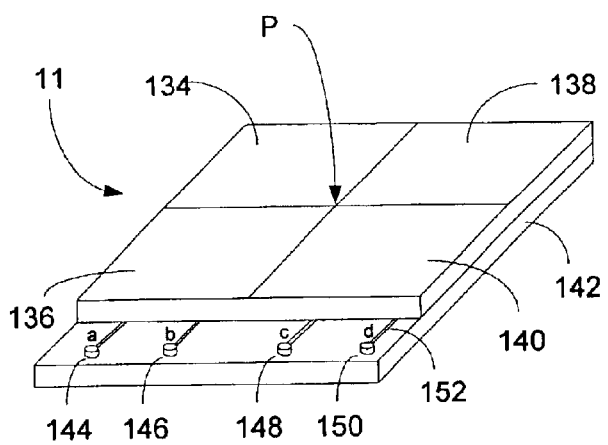
FIG. 3A illustrates an exemplary quad detector having quadrants a, b, c, and d in accordance with the present invention.

The exemplary quad-detector 11 is illustrated in FIG. 3A. The quad detector 11 has four individual quadrants or detector elements 134, 136, 138 and 140. Each of the elements may be commonly mounted on a single substrate-carrier 142, for example. Specifically, the detector elements 134, 136, 138 and 140 include four discrete photosensitive elements (not shown) that are laid out in quadrants on the carrier 142. Each detector element 134, 136, 138 and 140 has a corresponding output (e.g., bond pad electrodes 144, 146, 148 and 150 with connecting trace wires 152 formed on the substrate, for example). Each detector element 134, 136, 138 and 140 generates a signal proportional to the amount of the optical energy impinging on it. These signals are provided to the processor 60 which in turn analyzes the relative amounts of optical energy received by each detector element.

Ideally, the alignment beam 117 is centered at the intersection, or null point P, of the four detector elements 134, 136, 138 and 140. Unequal distribution of received optical energy between the detector elements 134, 136, 138 and 140 is detected by the processor 60 using known techniques. In turn, the processor 60 alters the angle of the steering mirror 57 via a servo actuator (not shown), thus changing the position of the alignment beam 117 on the quad detector 11. Servo control systems are well known by those skilled in the art and will not be discussed in detail.

Figure 3B:
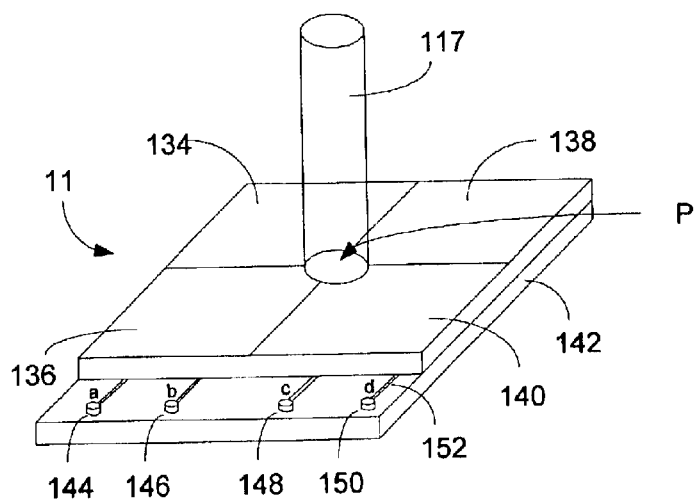
FIG. 3B illustrates normal operation (no mode-hopping) of the laser source under control of the alignment system.

Referring now to FIG. 3B, the alignment beam 117 is shown projected on the center or null point P of the quad detector 11. In this illustration, the alignment beam 117 is desirably centered on the quad detector 11, and thus, the alignment beam 117 is equally distributed across each detector element 134, 136, 138 and 140. Therefore, each detector element sends substantially the same magnitude signal back to the processor 60. In this instance, the processor 60 will maintain the angle of the steering mirror 57, as no correction to the position of the alignment beam 117 is necessary.

Figure 3C:
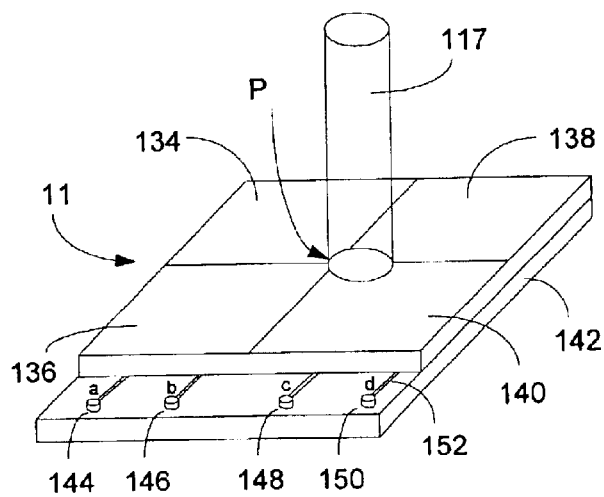
FIG. 3C illustrates the effect of mode-hopping of the laser source, resulting in a disturbance that causes the alignment beam to be off center.

Referring now to FIG. 3C, an illustration similar to FIG. 3B is shown. The alignment beam 117 in FIG. 3C, however, is not centered on the quad detector 31. Instead, the detector elements 138 and 140 receive a greater amount of optical energy than the detector elements 134 and 136. As a result, the signals received by the processor 60 from the detector elements 134 and 136 will be different than the signals sent from detector elements 138 and 140. Based on the relative differences in signals from the detector elements, the processor 60 alters the angle of the steering mirror 57 to center the alignment beam 117 on the quad detector 11.

Conventionally, even with a precisely tuned servo feedback, the alignment beam 117 may move off center from the quad detector 11 due to non-uniformities in the output of the laser diode 41 or other laser reference source. As was described previously, the alignment beam 117 is generated from an image of the original laser beam obtained through the pinhole 116. The laser diode 41 may dynamically change modes, commonly referred to as mode-hopping. Mode-hopping may occur for a variety of reasons, such as power changes to the laser diode, temperature changes, and natural aging of the laser diode. Mode-hopping has also been observed in response to changes in the percentage of the laser's output radiation that is reflected back into the laser. Mode-hopping produces non-uniformities in the laser beam generated by the laser diode 41. Consequently, non-uniformities may be present in the alignment beam 117, since the alignment beam 117 is derived from the laser beam generated by the laser diode 41. Ordinarily, these non-uniformities in the alignment reference source can cause errors in the alignment of the system 10.

Figure 3D:
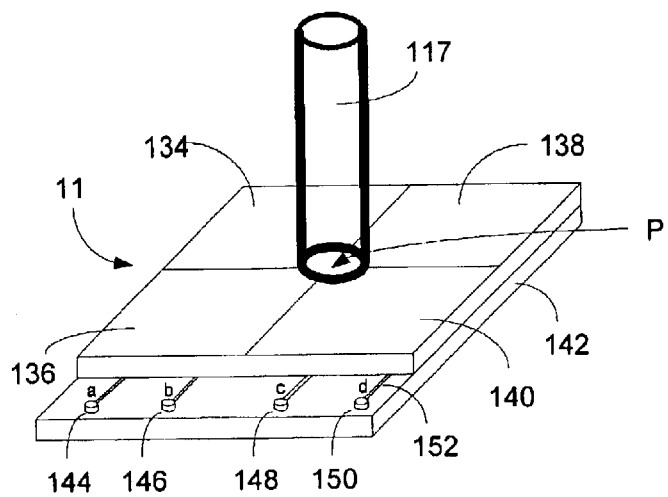
FIG. 3D illustrates the alignment beam generated by driving the semiconductor laser into continuous mode-hopping in accordance with the present invention.

If, however, the laser diode 41 is intentionally driven so as to mode-hop at a frequency greater than the upper frequency limit of the photodetector 11, then the photodetector 11 will effectively detect an average of the various modes of the laser diode 41. This "averaging effect" is illustrated in FIG. 3D, as the alignment beam 117 encompasses a slightly larger area (the average of all modes as seen by the quad detector 41) on the quad detector 41.

Since the alignment beam 117 as detected by the quad detector 41 is an average of all modes of operation of the laser diode 41, the alignment beam 117 is made more uniform and disturbances due to random mode-hopping are effectively reduced.

Figure 4:
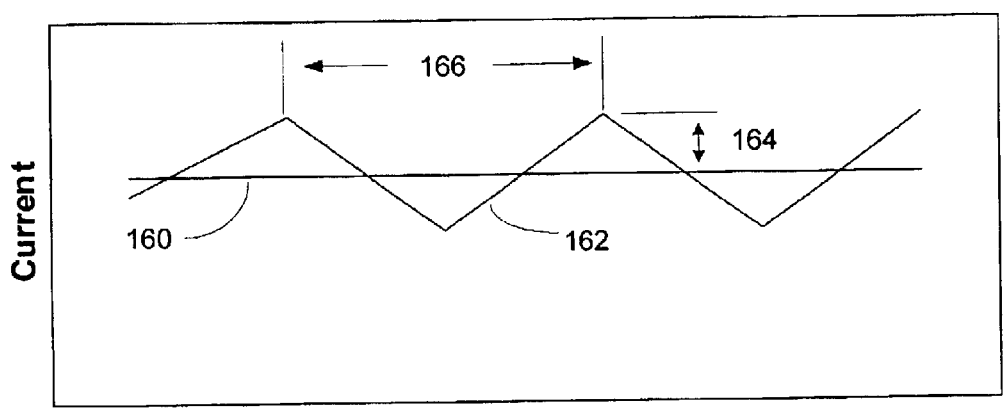
FIG. 4 illustrates the modulation of the laser power source in accordance with the present invention.

In accordance with the present invention, each laser diode is purposely driven to mode-hop by varying the power supplied to each laser diode 21, 31, 41. Referring back to FIG. 2, the modulated drive current source 58 supplies the modulated drive current to the laser diode 41. For example, the drive current is configured to include a DC component 160 and a high frequency AC component 162, which has an amplitude 164 and a period 166, superimposed on the DC component 160, as is illustrated if FIG. 4. Mode-hopping may be sustained if the amplitude 164 of the high frequency component 162 is of a magnitude great enough to turn the different operating modes of the laser diode 41 on and off.

Furthermore, the frequency of the high frequency component 162 is preferably greater than the upper frequency limit (i.e., response bandwidth) of the photodetector 11 so as to achieve the aforedescribed averaging. This produces a more uniform, average image of the alignment beam 117 as seen by the photodetector, consisting of the average of all the various modes in which the laser diode 41 operates. It will be appreciated that the particular amplitude and frequency of the high frequency component 162 may be determined empirically or by design by one having ordinary skill in the art without undue effort based on the description herein.

By driving the laser diode or other semiconductor laser 41 so as to mode-hop at a frequency above the upper frequency limit of the multi-element detector 11, the alignment beam 117 appears more uniform to the multi-element photodetector 11. A more uniform alignment beam 17 results in increased stability within the closed control loop, and thus better overall control of the alignment system 10.

The laser alignment system 100 has been described with reference to the laser optical bench 52, and in particular, with reference to the laser reference source 41. It will be appreciated, however, that the principles disclosed with respect to the laser reference source 41 also may be applied to the IR reference source 21 and the CCD reference source 31 shown in FIG. 1. For example, the IR receiver reference source 21 may be modulated by a modulated drive current 58', thus driving the IR receiver reference source 21 into mode-hop. If the frequency of modulation is greater than the upper frequency limit of the photodetector 11, then the photodetector 11 will effectively detect an average of the various modes of the IR reference source 21. Similarly, the CCD reference source 31 may be driven into mode-hop by a modulated current source 58". Again, if the frequency of modulation is greater than the upper frequency limit of the photodetector 11, the photodetector 11 will effectively detect an average of the various modes of the CCD reference source 31. In both cases, the averaging of the laser reference source provides a more uniform reference source, and thus improved performance of the alignment system 100.

While particular embodiments of the invention have been described in detail, it is understood that the invention is not limited correspondingly in scope, but includes all changes, modifications and equivalents coming within the spirit and terms of the claims appended hereto. For example, while the present invention has been described in the context of an ATFLIR system, other laser based alignment systems may also incorporate the features of the invention.

What is claimed is:

1. An optical alignment system, comprising:

a semiconductor laser for generating an alignment beam;

a photodetector for detecting the position of the alignment beam, wherein the photodetector provides a position feedback signal indicative of the position of the alignment beam;

an optical system for directing the alignment beam, wherein the optical system includes at least one beam steering device, and a controller for controlling the at least one beam steering device to control the position of the alignment beam on the photodetector based on the position feedback signal; and a modulated drive current source for providing a modulated drive current to the semiconductor laser, wherein the modulated drive current is modulated at a frequency and amplitude which causes the semiconductor laser to mode-hop at a frequency which is greater than the upper frequency limit of the photodetector.

2. The optical alignment system of claim 1, wherein the photodetector is a quad-detector.

3. The optical alignment system of claim 1, wherein the semiconductor laser is a laser diode.

4. The optical alignment system of claim 1, wherein the beam steering device also steers a separate laser beam coaligned with the alignment beam from a line-of-sight laser source.

5. The optical alignment system of claim 1, wherein the beam steering device also steers an IR beam coaligned with the alignment beam from a line-of-sight laser source.

6. The optical alignment system of claim 1, wherein the beam steering device also steers a visible beam coaligned with the alignment beam from a line-of-sight laser source.

7. The optical alignment system of claim 1, wherein the optical system includes at least one beam splitter.

8. The optical alignment system of claim 1, wherein the optical system includes at least one lens.

9. The optical alignment system of claim 1, wherein the alignment beam is derived from an image of the semiconductor laser output.

10. The optical alignment system of claim 1, wherein the modulated drive current source outputs a DC component and a high frequency AC component superimposed on the DC component.

11. The optical alignment system of claim 1, wherein the beam steering device includes a servo actuator controlled by the controller.

12. The optical alignment system of claim 11, wherein the servo actuator controls at least one axis of motion of the beam steering device.

13. A method of creating an optical alignment system, comprising the steps of:

generating an alignment beam from a semiconductor laser;

detecting the position of the alignment beam on a photodetector, wherein the photodetector provides a position feedback signal indicative of the position of the alignment beam;

using an optical system to direct the alignment beam, wherein the optical system includes at least one beam steering device, and a controller for controlling the at least one beam steering device to control the position of the alignment beam on the photodetector based on the position feedback signal; and providing a modulated drive current to the semiconductor laser, wherein the modulated drive current is modulated at a frequency and amplitude which causes the semiconductor laser to mode-hop at a frequency which is greater than the upper frequency limit of the photodetector.

14. The method of claim 13, wherein the photodetector is a quad-detector.

15. The method of claim 13, wherein the semiconductor laser is a laser diode.

16. The method of claim 13, wherein the beam steering device also steers a separate laser beam coaligned with the alignment beam from a line-of-sight laser source.

17. The method of claim 13, wherein the optical system includes at least one beam splitter.

18. The method of claim 13, wherein the optical system includes at least one lens.

19. The method of claim 13, wherein the alignment beam is derived from an image of the semiconductor laser output.

20. The method of claim 13, wherein the modulated drive current includes a DC component and a high frequency AC component superimposed on the DC component.

21. The method of claim 13, wherein the beam steering device includes a servo actuator controlled by the controller.

22. The method of claim 21, wherein the servo actuator controls at least one axis of motion of the beam steering device.

* * * * *